United States Patent
Funakura

(10) Patent No.: US 7,440,013 B2
(45) Date of Patent: Oct. 21, 2008

(54) IMAGE PICKUP DEVICE WITH FACIAL REGION DETECTOR AND METHOD OF SYNTHESIZING IMAGE INCLUDING FACIAL REGION

(75) Inventor: Hiroyuki Funakura, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 666 days.

(21) Appl. No.: 10/916,422

(22) Filed: Aug. 12, 2004

(65) Prior Publication Data

US 2005/0036044 A1    Feb. 17, 2005

(30) Foreign Application Priority Data

Aug. 14, 2003   (JP)   ............... 2003-207589
Aug. 2, 2004    (JP)   ............... 2004-226027

(51) Int. Cl.
  *H04N 5/232* (2006.01)
(52) U.S. Cl. .................. 348/239; 348/333.05; 382/284
(58) Field of Classification Search ................. 348/239, 348/333.05, 36, 211.12; 382/284
  See application file for complete search history.

(56) References Cited

U.S. PATENT DOCUMENTS

| 5,629,752 | A | 5/1997 | Kinjo | |
| 6,359,649 | B1* | 3/2002 | Suzuki | ............ 348/220.1 |
| 7,236,629 | B2* | 6/2007 | Cooper et al. | ............ 382/171 |
| 2002/0001036 | A1* | 1/2002 | Kinjo | ............ 348/231 |
| 2002/0031262 | A1 | 3/2002 | Imagawa et al. | |
| 2002/0054032 | A1* | 5/2002 | Aoki et al. | ............ 345/204 |
| 2003/0012425 | A1* | 1/2003 | Suzuki et al. | ............ 382/154 |
| 2003/0036365 | A1* | 2/2003 | Kuroda | ............ 455/90 |

FOREIGN PATENT DOCUMENTS

| JP | 2000-253118 A | 9/2000 |
| JP | 2000-350123 A | 12/2000 |
| JP | 2001-218020 A | 8/2001 |
| WO | WO 02/085018 A1 | 10/2002 |
| WO | WO 2004/039065 A1 | 5/2004 |

OTHER PUBLICATIONS

T. Jokela, "Authoring Tools for Mobile Multimedia Content", Nokia Research Center, IEEE ICME 2003, vol. 2, Jul. 6, 2003, pp. 637-640.

* cited by examiner

*Primary Examiner*—Lin Ye
*Assistant Examiner*—Gevell Selby
(74) *Attorney, Agent, or Firm*—Sughrue Mion, PLLC

(57) ABSTRACT

An image pickup device is constituted by a handset of cellular phone, wherein an image pickup unit photographs a user as first object, to output image data of a first image frame. A facial region detecting circuit retrieves a facial image portion of the user as first object according to image data of the first image frame. An image synthesizing circuit is supplied with image data of a second image frame including persons as second object. The facial image portion is synthesized in a background region being defined outside the persons as second object within the second image frame.

33 Claims, 15 Drawing Sheets

FIG. 11
1ST PERSON IS PICKED UP
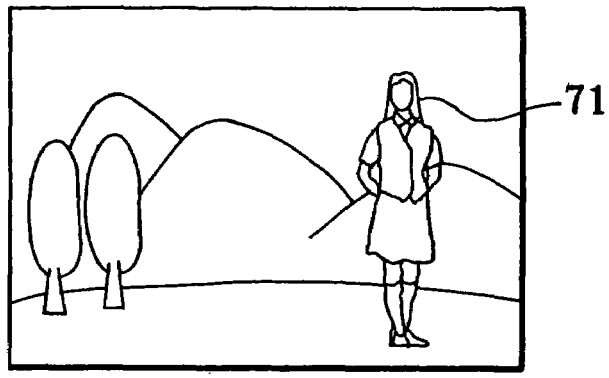
2ND PERSON IS FRAMED WHILE
1ST PERSON IS DISPLAYED UNCLEARLY
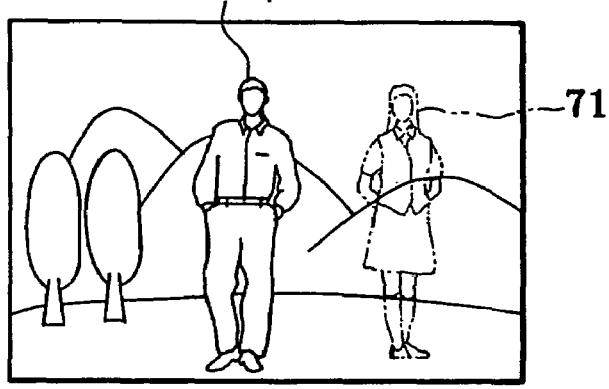
PICKUP & SYNTHESIS
SYNTHESIZED IMAGE
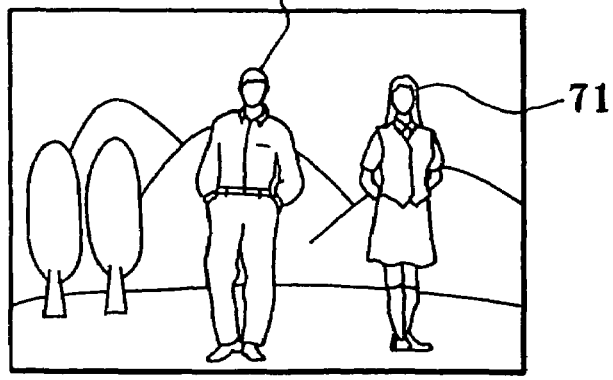

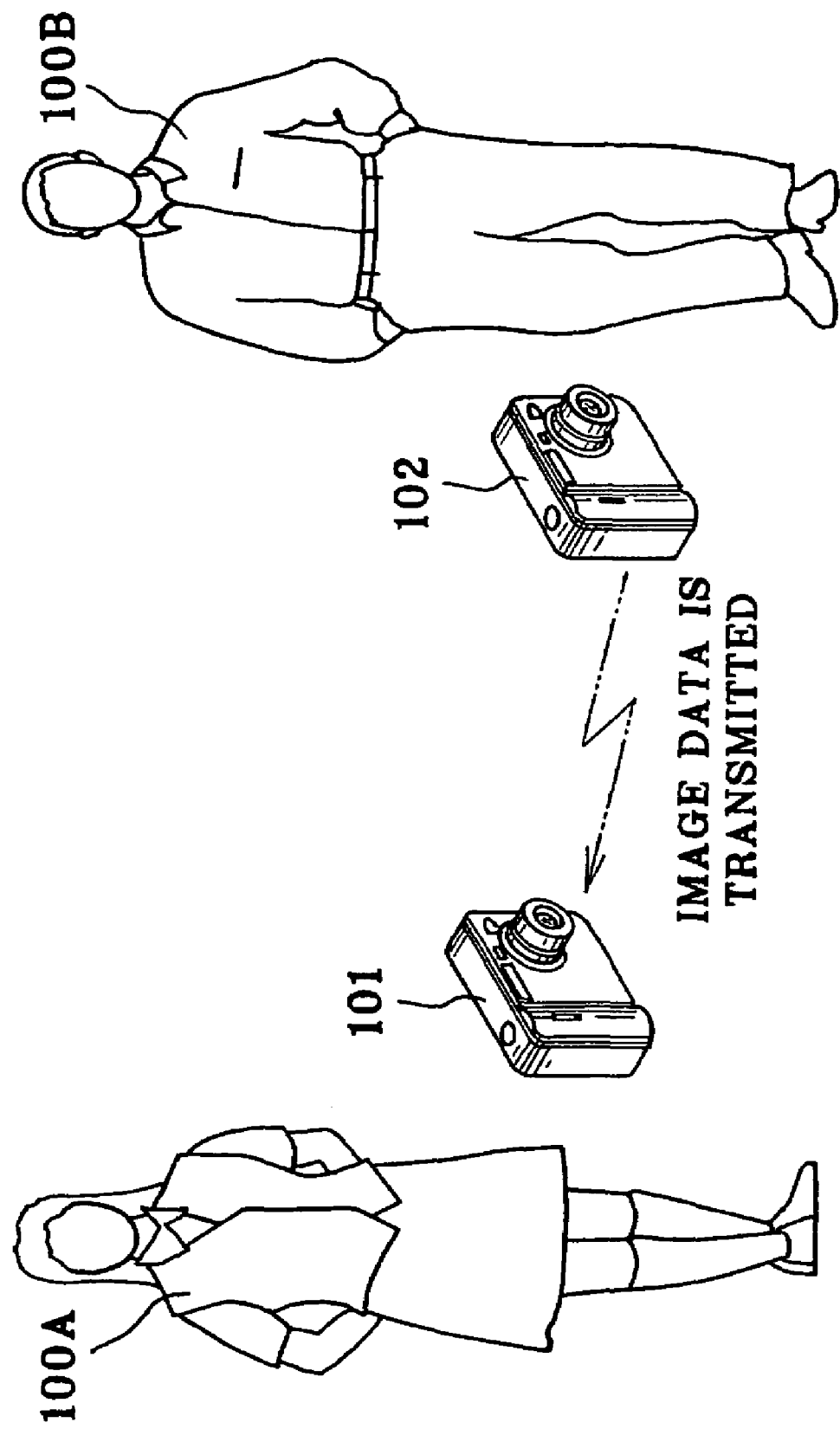

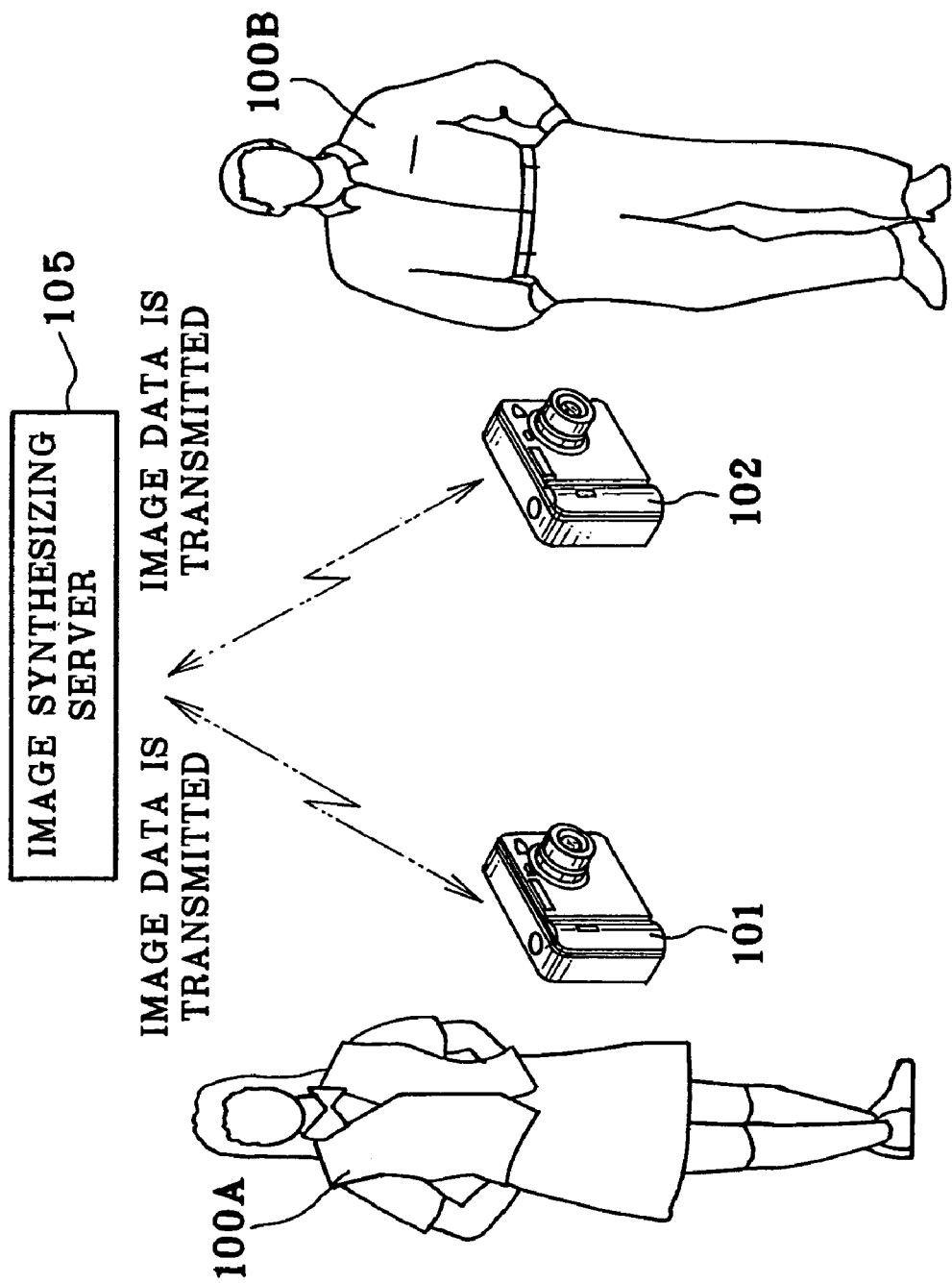

IMAGE PICKUP DEVICE WITH FACIAL REGION DETECTOR AND METHOD OF SYNTHESIZING IMAGE INCLUDING FACIAL REGION

BACKGROUND OF THE INVENTION

1. Field of the Invention

The present invention relates to an image pickup device and image synthesizing method. More particularly, the present invention relates to an image pickup device with which images can be synthesized easily, and an image synthesizing method in which images being picked up can be edited readily and easily.

2. Description Related to the Prior Art

Electronic image pickup devices include an image pickup unit. Examples of such devices include a digital still camera, a handset of a cellular phone, PDA (Personal Digital Assistant), and the like. Examples of pickup elements in the image pickup unit are CCD, CMOS and the like. Those are simple constructions for electronically photographing images of objects. Specifically, the cellular phone has a body in which the image pickup unit is used to pick up an image of an object. A display panel of the cellular phone is driven to display the image for checking or simulation. Also, the cellular phone is capable of wireless transmitting the image data of the image to one other external terminal of communication.

JP-A 2000-253118 discloses a handset of a cellular phone having a single image pickup unit. U.S. Pub. No. 2003/036, 365 (corresponding to JP-A 2003-060765) discloses the cellular phone having two image pickup units directed in different directions.

One type of a handset of a cellular phone includes a single image pickup unit. Some user wishes to pick up a person and the user himself or herself. To this end, the user directs the cellular phone to the person to pick up an image of the person. Then the user directs the cellular phone to himself or herself to pick up an image of a self-portrait.

Another type of handset of a cellular phone has a body, a first of the image pickup units on a front face of the body, and a second of the image pickup units on a rear face of the body directed to a user. At first, the first image pickup unit is driven to pick up an image of the person. Then the second image pickup unit is driven to pick up an image of the user. With this type of the cellular phone having the image pickup units directed in the two directions, it is possible to photograph the user and the person without changing the orientation of the image pickup unit. Images of the person and the user are separately displayed on the display panel.

It is necessary for the user to hold the handset of a cellular phone manually by a hand. The user cannot be photographed at the same time as the person in the view field. In the cellular phone according to the prior art and having the two image pickup units, a selecting operation is required for designating a selected one of the two image pickup units directed to the front and to the rear. Taking a photograph at the same time for the person and the user is impossible.

If a user wishes to take a group photograph with a number of persons, there is a problem in the handset of a cellular phone. The user holding the cellular phone cannot join the group of the persons to be photographed. It is certain that the user can be photographed separately. However, the image of the group photograph of the persons is separate from the image obtained by photographing the user. No known technique of the cellular phone can provide solution of this problem. Other types of image pickup devices, such as a digital still camera, have the same problem.

SUMMARY OF THE INVENTION

In view of the foregoing problems, an object of the present invention is to provide an image pickup device with which images can be synthesized easily, and an image synthesizing method in which images being picked up can be edited readily and easily.

In order to achieve the above and other objects and advantages of this invention, an image pickup device for photographing an object to output image data is provided, in which a facial region detector retrieves at least a facial region of a first object in a first image in which the first object is a principal object thereof. An image synthesizing unit creates a synthesized image by combining a second image with the facial region from the facial region detector, the second image having a second object constituting a principal object thereof, wherein the facial region is disposed in a background region beside the second object within the second image.

Specifically, an image pickup device includes at least one image pickup unit for photographing at least a first object, to output image data of a first image. A facial region detector retrieves a facial image portion of the first or second object according to image data of one of the first image and a second image, the first and second images including respectively the first object and a second object. An image synthesizing unit is supplied with image data of a remaining one of the first and second images, and synthesizes the facial image portion in a background region being defined outside the first or second object within the first or second image.

Furthermore, a display panel displays a synthesized image according to an output of the image synthesizing unit.

Furthermore, a region determining unit determines a region of first or second object within the remaining image, and the background region outside thereof, wherein the image synthesizing unit synthesizes the facial image portion according thereto.

The image synthesizing unit further trims the facial image portion according to a predetermined combining pattern before image synthesis.

The facial region detector detects an eye position from the facial image portion, and the image synthesizing unit positions the combining pattern in consideration of the eye position.

The eye position is a mid point of two eyes of the facial image portion, and a center of the combining pattern is set at the mid point.

Furthermore, a pattern memory stores information of plural combining patterns, a selected one of the plural combining patterns being designated for use in the image synthesizing unit.

The image synthesizing unit enlarges or reduces a size of the facial image portion to be synthesized.

At least one image pickup unit comprises a first image pickup unit, oriented in a direction toward an image pickup device user constituting the first object, and adapted to a self-portrait image pickup. A second image pickup unit is oriented in a direction opposite to the direction of the first image pickup unit, the second object being different from the image pickup device user.

The display panel displays the first and second images in an overlapped form according to outputs of the first and second image pickup units. Furthermore, a single shutter button is shiftable for driving the first and second image pickup units together.

The image synthesizing unit corrects chromaticity or brightness of one of the first and second images in a manner of chromaticity or brightness of a remaining one of the first and second images before image synthesis.

Furthermore, a controller causes the display panel to display the first image by reading the first image, and simultaneously causes the display panel to display the second object being framed, so as to simulate a synthesized form of the first and second objects.

The display panel displays the first image at a low density or low sharpness, and overlapped on the second image.

In one preferred embodiment, the display panel displays the combining pattern in the background region of the first image, and the second image is displayed at least partially in the combining pattern.

The image pickup unit photographs the first and second objects, to output the image data of the first and second images.

In another preferred embodiment, furthermore, a memory stores the image data of the second image, the image data being read therefrom.

The facial region detector processes the second image by region detecting processing, and the image synthesizing unit synthesizes the facial image portion in the first image.

In one preferred embodiment, the facial region detector processes the first image by region detecting processing, and the image synthesizing unit synthesizes the facial image portion in the second image.

In still another preferred embodiment, furthermore, a communication unit receives the image data of the second image from an external electronic device, the image data being input to the facial region detector or the image synthesizing unit.

The communication unit is wireless.

The communication unit operates in connection with a public communication cable.

Furthermore, a communication unit transmits the image data to an image synthesizing electronic device, the image data being of one of the first and second images from the image pickup unit.

Also, an image synthesizing method is provided, in which at least one portion of a first object is retrieved according to image data of a first image including the first object. According to image data of a second image including a second object, the first object is synthesized in a background region defined outside the second object within the second image.

The first and second objects are photographed by at least one image pickup device, to output the image data of first and second image data.

The first object comprises a facial image portion of a person.

In one preferred embodiment, furthermore, a first height of the first object in the first image and a second height of the second object in the second image are obtained according to image analysis. A height ratio is obtained between the first and second objects in a height inside a group image including at least the first and second objects by image analysis of the group image. A size of the first or second image is enlarged or reduced according to the height ratio, to correct the first or second height to set a relation of image portions of the first and second objects equal to a relation thereof in the group image, wherein the synthesized image is produced subsequently from the first and second images.

In another preferred embodiment, furthermore, a first height ratio of a first height of the first object in the first image to a height of a reference photographed object is obtained. A second height ratio of a second height of the second object in the second image to a height of the reference photographed object is obtained. One of the first and second height ratios is divided by a remaining one of the first and second height ratios, to obtain a correcting coefficient for the first and second objects. A size of the first or second image is enlarged or reduced by multiplication of the correcting coefficient, to correct the first or second height by considering the height of the reference photographed object, wherein the synthesized image is produced subsequently from the first and second images.

The first and second objects are photographed to obtain the image data of the first and second images.

The image data of respectively the first and second images are read from a memory and are input.

In one preferred embodiment, the image pickup device photographs the first image. The image data of the second image is input to the image pickup device by a communication unit.

Furthermore, the second image is photographed by use of a second image pickup device, wherein the image data of the second image is transmitted from the second image pickup device to the image pickup device by a communication unit.

In still another preferred embodiment, furthermore, the image data of respectively the first and second images are output by use of first and second image pickup devices. The image data of respectively the first and second images are transmitted from the first and second image pickup devices to an image synthesizing electronic device by a communication unit for image synthesis.

In one preferred embodiment, the first object comprises a human body.

Consequently, images can be synthesized easily, because the region detection is used to combine the facial region, body region or a certain region of a photographed object in the image pickup device.

BRIEF DESCRIPTION OF THE DRAWINGS

The above objects and advantages of the present invention will become more apparent from the following detailed description when read in connection with the accompanying drawings, in which:

FIG. 11 is an explanatory view illustrating an embodiment where a first one of two image frames is displayed unclearly;

FIG. 13 is an explanatory view in perspective, illustrating one preferred embodiment with two digital still cameras in use;

FIG. 14 is an explanatory view in perspective, illustrating one embodiment where an image synthesizing server synthesizes images by use of communication.

DETAILED DESCRIPTION OF THE PREFERRED EMBODIMENT(S) OF THE PRESENT INVENTION

Figure 1:
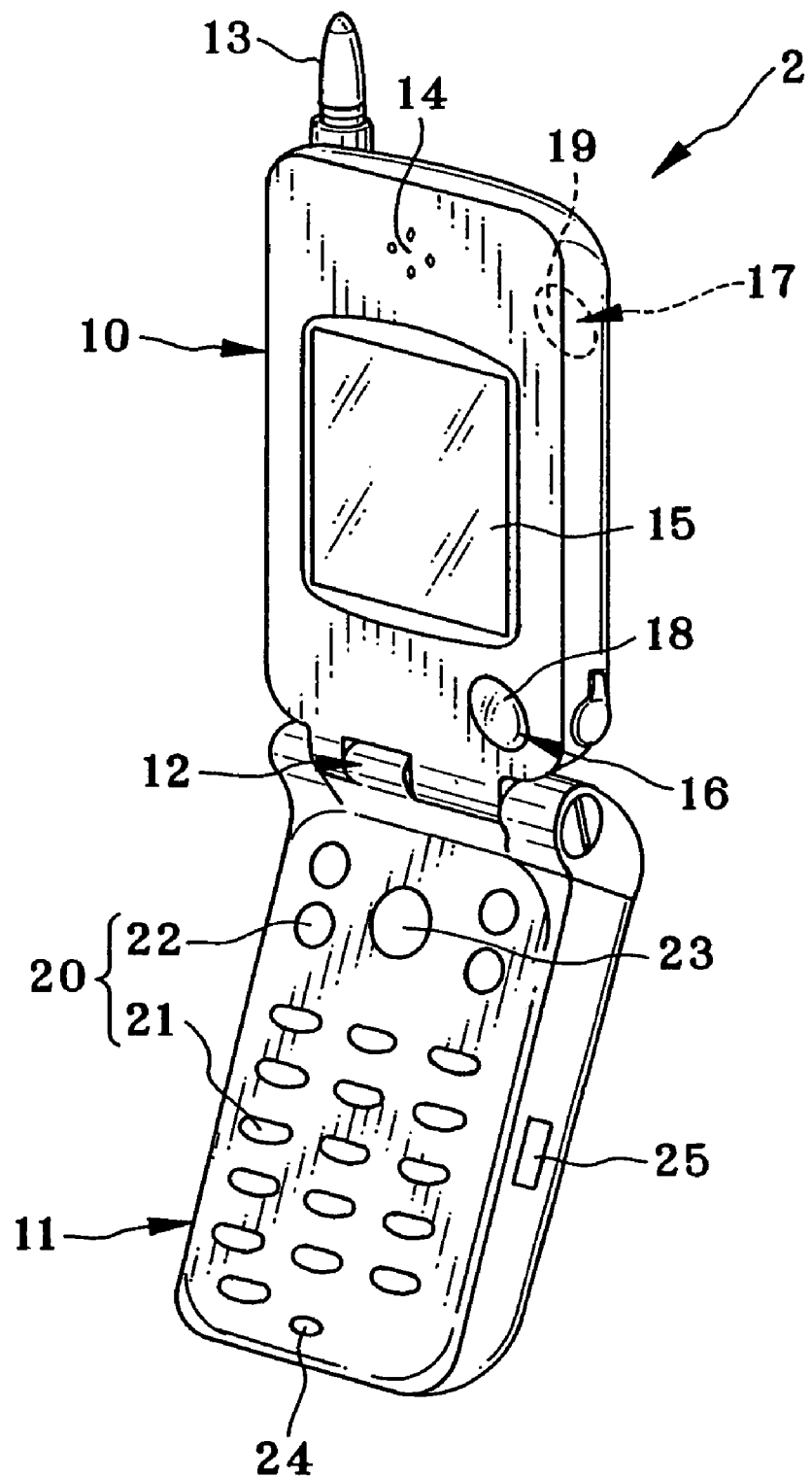
FIG. 1 is a perspective view illustrating a handset of cellular phone.

In FIG. 1, a handset of cellular phone or mobile communication terminal 2 is illustrated. The cellular phone 2 includes an upper housing 10 and a lower housing 11. A hinge mechanism 12 connects the upper housing 10 with the lower housing 11 mechanically in a manner pivotally movable thereabout. A transmission/reception antenna 13 is contained in a rear chamber of the upper housing 10, and transmits and receives a radio signal for communication. A front of the upper housing 10 has an LCD display panel 15 and a speaker 14, which acoustically outputs voices of a person communicating with the user, musical sounds signally the reception of the communication, and other sounds.

A first image pickup unit 16 is disposed in a first face of the upper housing 10, and directed toward a camera user. A second image pickup unit 17 is disposed in a second face of the upper housing 10, and directed to a photographic field. A self-portrait pickup lens 18 of the first image pickup unit 16 receives light from the user side of the handset of the cellular phone 2. An objective pickup lens 19 of the second image pickup unit 17 receives light from the objective side.

A key panel 20 is disposed on the lower housing 11 for manually operating the handset of the cellular phone 2, and includes keypads 21, mode selection keys 22 or buttons, a shutter button 23, a microphone 24, and an external interface (I/F) 25. The keypads 21 are associated with numbers, characters or signs and used for inputting a telephone number or characters. The mode selection keys 22 are used for setting an operation mode of the cellular phone 2. The shutter button 23 is depressible for pickup of an image. The microphone 24 receives voices of a user. Three modes are selectable with the mode selection keys 22, including a telephone mode, a normal pickup mode, and a synthesizing mode.

A retention mechanism (not shown) in a clicked structure is provided on the hinge mechanism 12 for retaining the upper housing 10 relative to the lower housing 11 at a predetermined angle as shown while the handset of the cellular phone 2 is used. The cellular phone 2 when not used is folded to set the upper housing 10 opposed to the lower housing 11.

Figure 2:
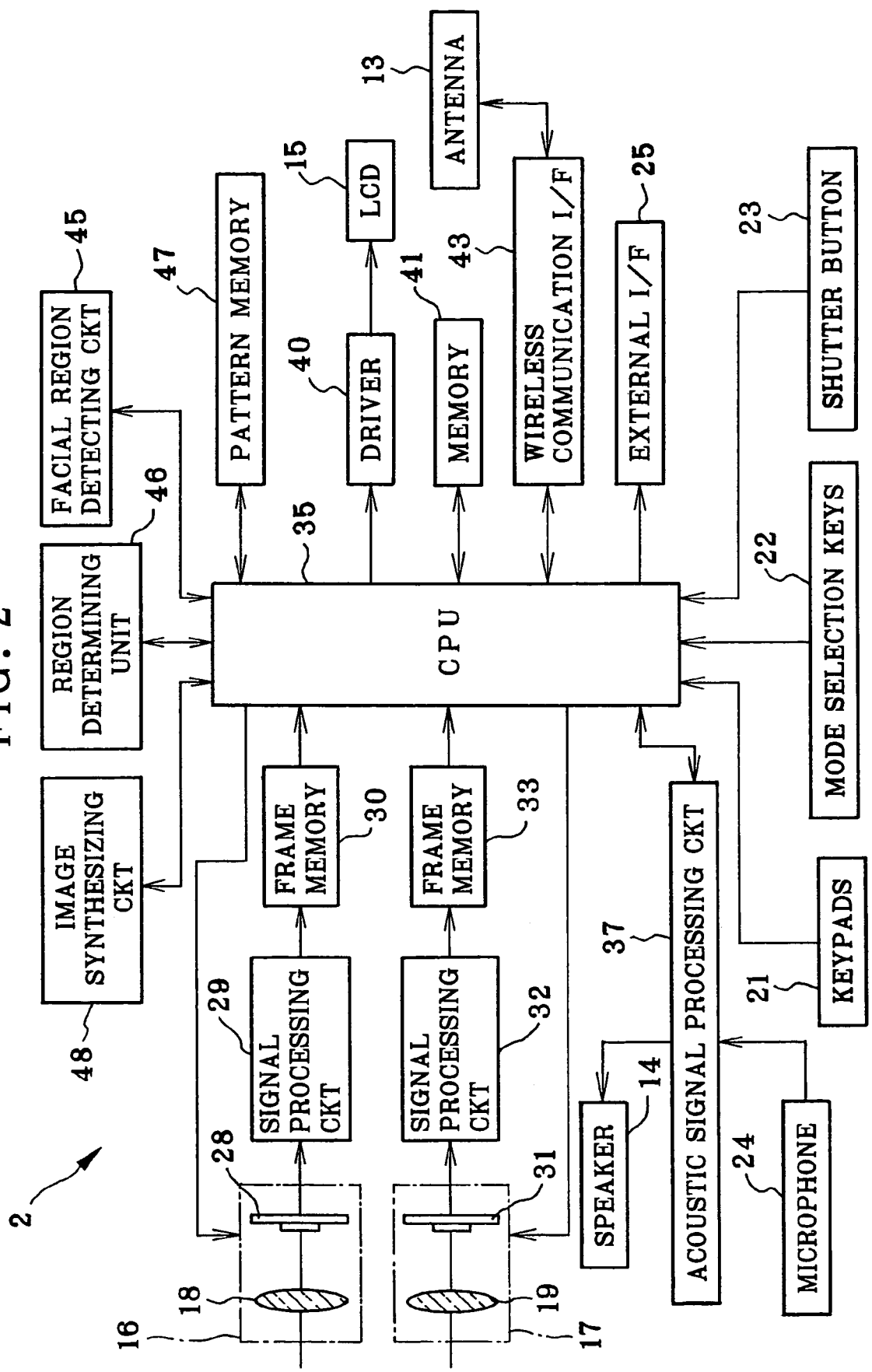
FIG. 2 is a block diagram schematically illustrating elements of the cellular phone.

In FIG. 2, elements of the handset of the cellular phone 2 are schematically illustrated. A pickup element 28, such as CCD or other image sensors, is combined with the self-portrait pickup lens 18 in the first image pickup unit 16, and converts an object image focused by the self-portrait pickup lens 18 into an image signal. A signal processing circuit 29 processes the image signal, and converts the image signal into image data in a digital form. There is a frame memory 30 to which the image data is written in a temporary manner.

The second image pickup unit 17 is structurally equal to the first image pickup unit 16. A pickup element 31 or image sensor receives object light from the objective pickup lens 19, and converts the light into an image signal, the object image being focused by the objective pickup lens 19 thereon. A signal processing circuit 32 converts the image signal into image data. There is a frame memory 33 to which the image data is written and stored in a temporary manner.

CPU 35 controls pickup of the first and second image pickup units 16 and 17. Also, an acoustic signal processing circuit 37 is controlled by CPU 35. When the microphone 24 receives an input of voice or sound, the acoustic signal processing circuit 37 processes the input by a predetermined processing. The speaker 14 is caused by an output of the acoustic signal processing circuit 37, and generates voice or sound externally.

Let the normal pickup mode be selected by operating the mode selection keys 22, to enable the first image pickup unit 16. A driver 40 is supplied by the image data read from the frame memory 30, so the LCD display panel 15 displays a live image or through image of the image data. A user views the live image, and frames a field to be photographed to target an object.

When the shutter button 23 is depressed, an image is picked up and recorded. Image data, being produced by the signal processing circuit 29, is compressed by a compression/expansion circuit (not shown). A memory 41 is accessed, to which the image data is written. The image data is read from the memory 41, subjected to data expansion, and sent to the driver 40, so that the LCD display panel 15 is caused to display the image being picked up. The mode selection keys 22 and the keypads 21 are manually operable. If a user desires, it is possible by operating those to write the image data from the memory 41 to a memory card (not shown) or other storage media in connection with the external I/F 25. Also, the image data can be output and sent to a printer or image forming device (not shown). There is a wireless communication interface (I/F) 43 in a communication unit, to which the image data from the memory 41 is sent by CPU 35. Then the wireless communication I/F 43 converts the image data to a radio signal by modulation. The radio signal to represent the image data is transmitted externally by the transmission/reception antenna 13 in the communication unit to a publicly used communication line (not shown). Note that, when the second image pickup unit 17 is enabled for pickup operation, the process of pickup is the same as the first image pickup unit 16.

Let a synthesizing mode be selected by operating the mode selection keys 22. The first and second image pickup units 16 and 17 are enabled for simultaneous pickup. The displayed image in the LCD display panel 15 is changeable over between live images or through images of the first and second image pickup units 16 and 17 by an input of the mode selection keys 22. The user determines the object to be picked up by checking the live image in the display panel 15.

Figure 3:
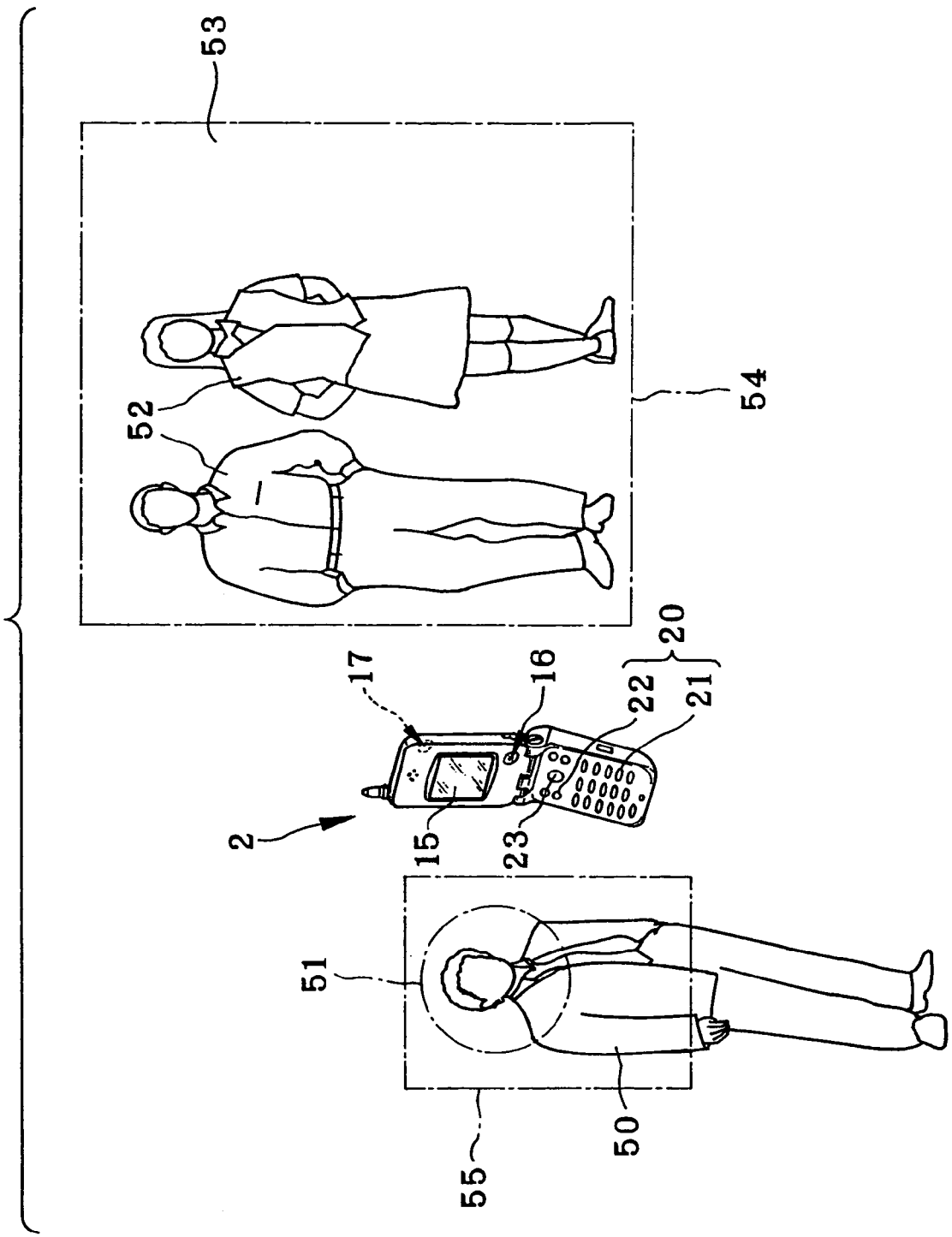
FIG. 3 is a perspective view illustrating a state of photographing both a user and a person.

When the shutter button 23 is depressed, the first and second image pickup units 16 and 17 simultaneously start pickup. Image data is obtained by the first image pickup unit 16 and the signal processing circuit 29. A facial region detecting circuit 45 is supplied by CPU 35 with the image data from the signal processing circuit 29. In FIG. 3, a camera user 50 being a person in a self-portrait is photographed. The facial region detecting circuit 45 detects a facial region 51 inside a first image frame 55. Note that the detecting of the facial region 51 is according to known techniques, for example U.S. Pat. No. 5,629,752 (corresponding to JP-A 8-184925) and JP-A 2001-218020. A hair portion of a human head is extracted from a A hair portion of a human head is extracted from a black region inside an image frame by checking higher density than a threshold density level. According to the hair portion, a line of a contour of the human head is derived.

It is to be noted that the term of the facial region according to the invention is used to mean a region of which a face is one portion, in addition to a region defined by a facial contour.

Image data is obtained by the second image pickup unit 17 and the signal processing circuit 32. A region determining unit 46 is supplied with the image data. In FIG. 3, persons 52 are photographed as an object. A background region 53 of a background is defined in a second image frame 54 about the persons 52. In the handset of the cellular phone 2, the region determining unit 46 determines the background region 53 distinct from a region of the persons 52 in the second image frame 54. Note that the determination of the persons 52 and the background region 53 is according to known techniques, for example JP-A 2000-350123. To determine the regions, object distance information is utilized, in particular information of a position of the object located inside an image frame.

A pattern memory 47 stores data of combining patterns, each of which is used for cropping or trimming the facial region 51 of the camera user 50 detected by the facial region detecting circuit 45. The combining patters are elliptical, star-shaped, quadrilateral or the like, and selectable by a user operating the key panel 20 manually. CPU 35 produces facial image data of the facial region 51 according to the selected combining region and the output of the facial region detecting circuit 45. An image synthesizing circuit 48 is provided by CPU 35 with the image data of the facial region 51.

It is to be noted that the combining patterns according to the invention may not be the preset patterns, but can be created in consideration of picking up a contour of the camera user 50. To this end, an automatic pattern generator creates a combining pattern by analyzing the contour of the region of the person or human head.

The image synthesizing circuit 48 evaluates a result of determination in the region determining unit 46 and information of the combining pattern, and creates the synthesized image data by combining image data of the facial region 51 from the facial region detecting circuit 45 with the second image frame 54 in the background region 53. If the memory 41 stores character data, CPU 35 reads the character data from the memory 41 at the time of the image synthesis. The character data is also combined with the second image frame 54 in the background region 53 together with the image data of the facial region 51. Note that the production and storing of the character data described above is executed by CPU 35 upon predetermined inputs of the key panel 20.

The synthesized image data is written to the memory 41 in a temporary manner, and transferred to the driver 40 by CPU 35, for the LCD display panel 15 to display the synthesized image. The user can operate the mode selection keys 22 and the keypads 21 to input signals according to a predetermined pattern of key depression. Then the synthesized image data is modulated to produce a radio signal, which is transmitted by the transmission/reception antenna 13 to a public communication cable. It is also possible to output the synthesized image data to a storage medium or printer.

The operation of the handset of the cellular phone 2 is described now. The mode selection keys 22 are manually operated, to set a synthesizing mode for image synthesis. If a camera user desires to store character image data, he or she produces the character image data by operating the key panel 20, and writes the data to the memory 41. Also, a desired one of the combining patterns are selected by operating the key panel 20. For example, a combining pattern of an elliptical shape is selected. Also, the cellular phone 2 is set up in such a manner as to display an image frame photographed by the second image pickup unit 17 in the display panel 15 as a live image or through image.

Figure 4:
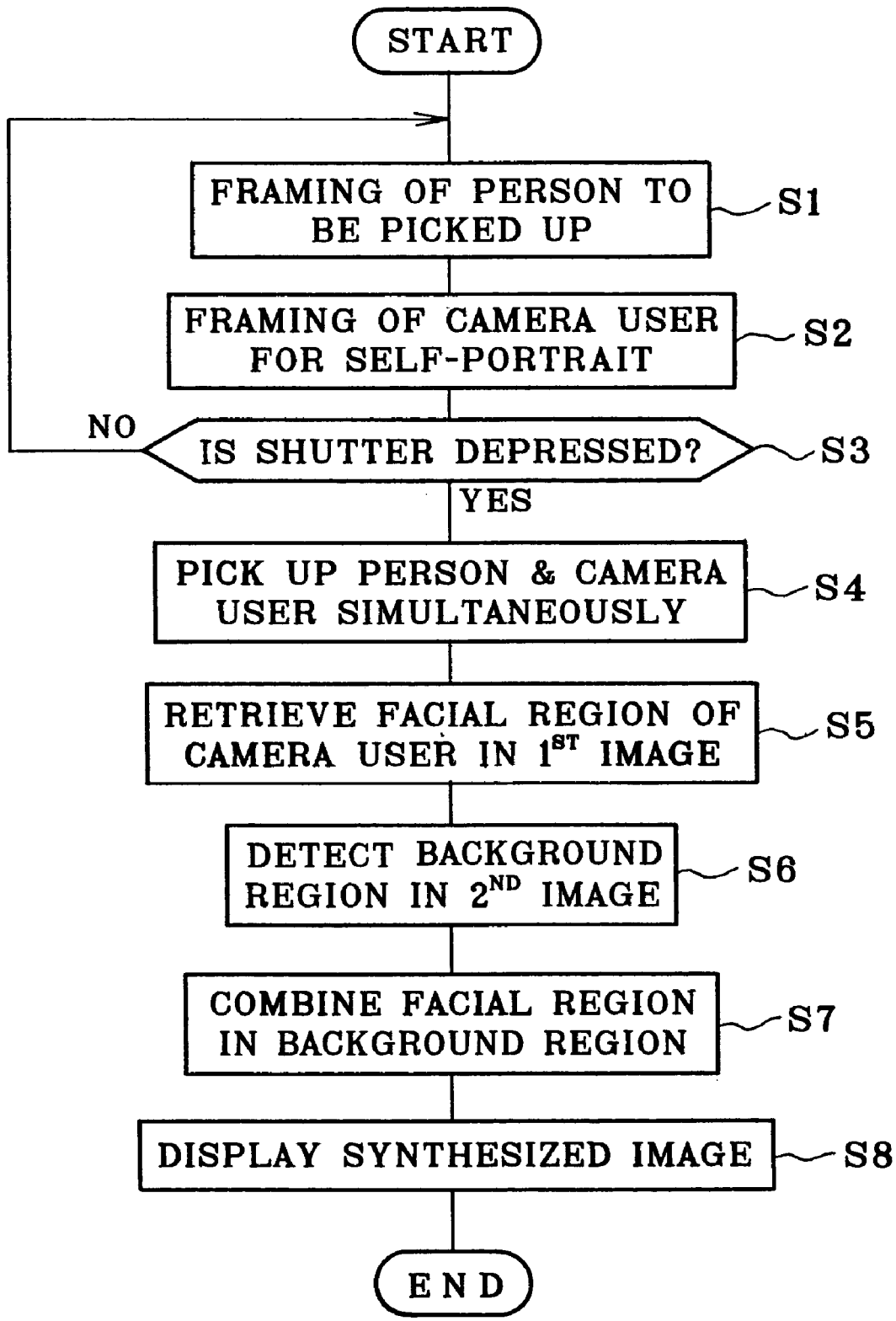
FIG. 4 is a flow chart illustrating a process of obtaining an image synthesis.

In FIG. 3, the first image pickup unit 16 is directed to the camera user 50, at the same time as the second image pickup unit 17 is directed to the persons 52. The LCD display panel 15 displays an image of the persons 52 as a live image or through image according to the second image pickup unit 17. The camera user 50 observes the live image, adjusts the position of the handset of the cellular phone 2 in checking the live image, for the purpose of framing to display the persons 52 and the background region 53 in the display panel 15. This is the step S1 of FIG. 4.

Then the mode selection keys 22 are actuated, to cause the LCD display panel 15 to display a live image or through image of the camera user 50 as picked up by the first image pickup unit 16. The camera user 50 checks the live image visually, and frames his or her face on the display panel 15. This is the step S2. The camera user 50 checks both live images from the first and second image pickup units 16 and 17, and finally adjusts the disposition of the camera user 50 and the persons 52 on the display panel 15. He or she depressed the shutter button 23 as soon as his or her intended framing is obtained at the step S3. If no acceptable framing is obtained, he or she alters the framing again at the step S1.

When the camera user 50 depresses the shutter button 23, the first image pickup unit 16 picks up the camera user 50. Simultaneously, the second image pickup unit 17 picks up the persons 52. This is the step S4. CPU 35 sends the facial region detecting circuit 45 the image data of the first image frame produced by the first image pickup unit 16. The facial region detecting circuit 45 detects the facial region 51 of the camera user 50 from the first image frame. CPU 35 retrieves the facial region 51 by cropping with a combining pattern in the elliptical shape, and outputs the facial region 51 being cropped to the image synthesizing circuit 48. This is the step S5. Also, CPU 35 sends the region determining unit 46 the image data of the second image frame produced by the second image pickup unit 17. The region determining unit 46 determines a region defined by the persons 52 in the second image frame and the background region 53 around the persons 52 at the step S6, and causes CPU 35 to send a result of the region determination to the image synthesizing circuit 48.

The image synthesizing circuit 48 responds to the result of determination of the region determining unit 46, and creates synthesized image data at the step S7, by combining the image data and character data with the background region 53 beside the persons 52 in the second image frame, the image data being output by the facial region detecting circuit 45 for the facial region 51 of the camera user 50, the character data being read from the memory 41.

Figure 5A:
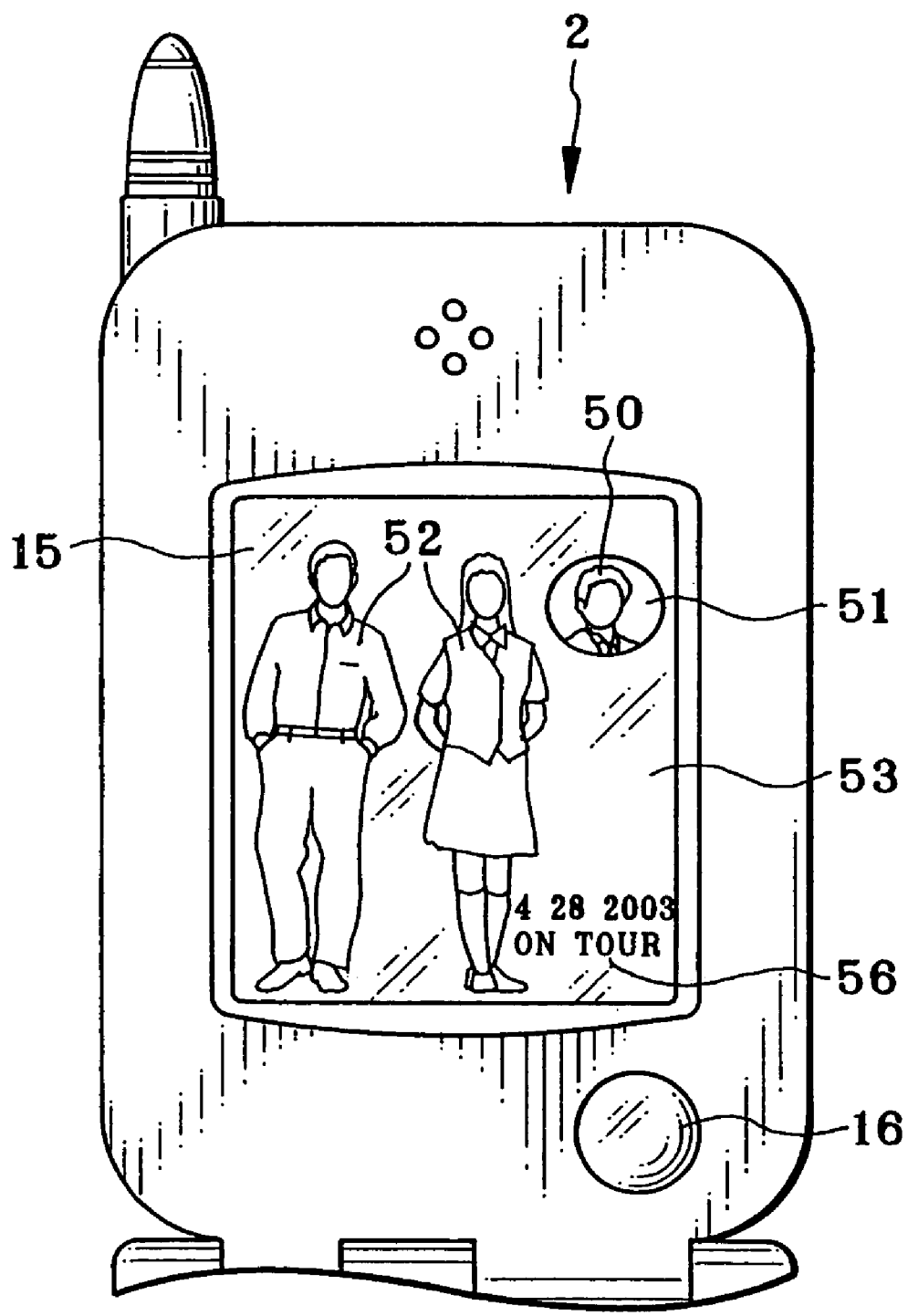
FIG. 5A is a front elevation, partially broken, illustrating a display panel with a synthesized image.

The synthesized image data from the image synthesizing circuit 48 is read by CPU 35, and output for displaying on the LCD display panel 15. In FIG. 5A, the facial region 51 and characters 56 are displayed in the background region 53 near to the persons 52 at the step S8. The facial region 51 of the camera user 50 is in an elliptical shape. Also, CPU 35 handles the synthesized image data according to inputs generated at the key panel 20. For example, CPU 35 writes the synthesized image data to the storage medium by use of the external I/F 25, and also can transmit the same wirelessly with the transmission/reception antenna 13 to the public communication cable.

In conclusion, it is possible to record an image of the camera user 50 with that of the persons 52 within a single image frame by creating the synthesized image data by combination of the facial region 51 with the background region 53, and simulating the synthesized image data on the LCD display panel 15. The combined record of the camera user 50 with the persons 52 makes it possible for both of the camera user 50 and the persons 52 to recollect their memorable scene easily.

In the present embodiment, the object person is photographed at the same time as the user in the portrait. However, the user may be photographed before or after the object person is photographed. For this purpose, it is possible for the handset of the cellular phone 2 to have two buttons for pickup. Alternatively, the single button for pickup may be depressed for two times.

In the embodiment, the mode selection keys 22 are operable for selective displaying of a live image or through image on the LCD display panel 15 between an output of the first image pickup unit 16 and an output of the second image pickup unit 17. However, it is possible to split the display panel 15 into two regions, and to display live images of the first and second image pickup units 16 and 17 at the same time on the display panel 15.

Furthermore, the region determining unit 46 may be omitted. A preset region with a preset position can be provided on the LCD display panel 15 for synthesis of the facial region 51 determined by the facial region detecting circuit 45. A combining pattern for the synthesis can be displayed in the preset position, so the display panel 15 can display a live image or through image of the camera user 50 in the combining region. Therefore, the live images of the first and second image pickup units 16 and 17 can be viewed at the same time. An image of the camera user 50 can be positioned in the background region 53 beside the persons 52 without operation of the region determining unit 46. The camera user 50 shifts the handset of the cellular phone 2 to change a pickup region. Also, the camera user 50 can have the persons 52 changed in the position. So a sufficiently large free region can be created in the display panel 15 beside the persons 52. A combining region may be inserted in the free region.

It is likely that the facial region 51 of the camera user 50 happens to be excessively large or small in comparison with the facial region of the persons 52. For such a case, it is possible to reduce or enlarge the size of the facial region 51 of the camera user 50 proportionally. This makes it possible to set the facial size of the camera user 50 visually equal to the facial size of the persons 52.

Figure 5B:
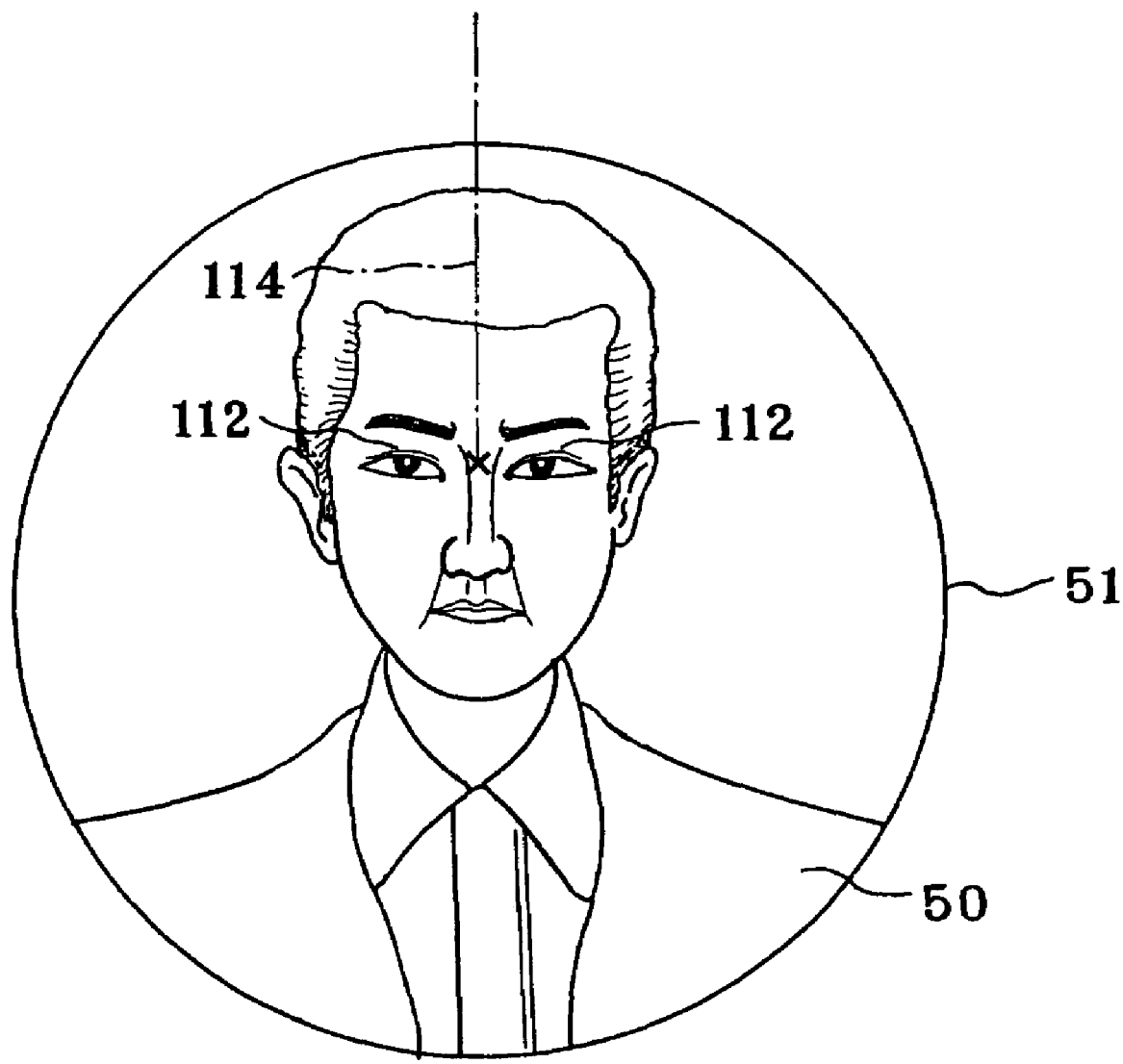
FIG. 5B is an explanatory view in plan, illustrating a facial region of a person, and positions of his or her eyes.

In the above embodiment, the predetermined region with the facial region 51 is trimmed. Furthermore, the position of the combinations of the two eyes can be preferably set at the center of the combining region. In FIG. 5B, one preferred embodiment is illustrated, in which human eyes 112 are depicted. The facial region detecting circuit 45 determines information of a contour of a facial region and positions of the human eyes 112 according to image data of the facial region 51. For example, JP-A 2001-218020 discloses retrieval of two black regions inside the facial region, to extract information of the human eyes 112. The contour information being determined, horizontal and vertical sizes of the facial portion are calculated. Then a mid point 114 of a straight line segment defined between the human eyes 112 is calculated according to the position information of the human eyes 112. According to the horizontal and vertical sizes, a combining pattern is created, for example in a quadrilateral shape. The mid point 114 of the combination of the human eyes 112 is set coincident with the center of the combining pattern as viewed in the horizontal direction, before the facial region 51 is trimmed. This makes it possible to keep the facial region 51 inside a predetermined space in the combining pattern. Also, image portions of the human eyes 112 of the camera user 50 can be positioned near to the center of the combining region. Camera shake with manual movement can be prevented to avoid shake of the image frame. The camera user 50 can check easily the live image of the second image pickup unit 17 on the LCD display panel 15, and can concentrate on the framing of the persons 52.

In the above embodiment, the facial image of a person is combined in the synthesis with an image of a person. However, it is possible to combine a facial image of a person in the synthesis with a foreground image other than a human image, for example a building, an individual object or the like that can be distinct from the background portion.

In the above embodiment, the facial region of a person is determined and trimmed. However, a body region of the person can be estimated according to the facial region being obtained. The entirety of the body of the person may be extracted and combined with the background. An apparent size of human images is likely to change between first and second image frames. This is because of the composition of the object to be photographed by the image pickup unit 16 or 17, or because of zooming state. To prevent such failure, height ratios between plural objects are calculated according to image frames previously picked up. The image synthesis can be effected after one or more of the object is subjected to enlargement or size reduction.

Furthermore, a position of a body region of the image synthesis is determined by considering the height ratios as well as the body size, before the image synthesis.

For example, tag information of photographing chronological information of a date or time of photography can be included in an image file of storing of image data. One set or plural sets of image data are read as having a nearest date or time according to the photographing chronological information of the date or time, to obtain feature information of a face of the person, such as a position of eyes, a nose or a mouth, or a hairstyle. If bodies of plural persons have been photographed in a single image frame, CPU 35 calculates a ratio between heights of the bodies.

Figure 6A:
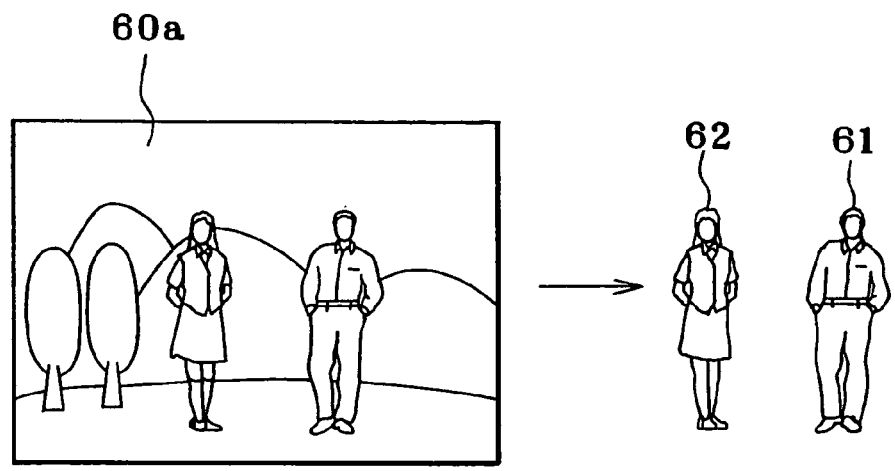
FIGS. 6A, 6B and 6C are an explanatory view in plan, illustrating combinations of group image frames and persons for use in determining height ratios.
Figure 6B:
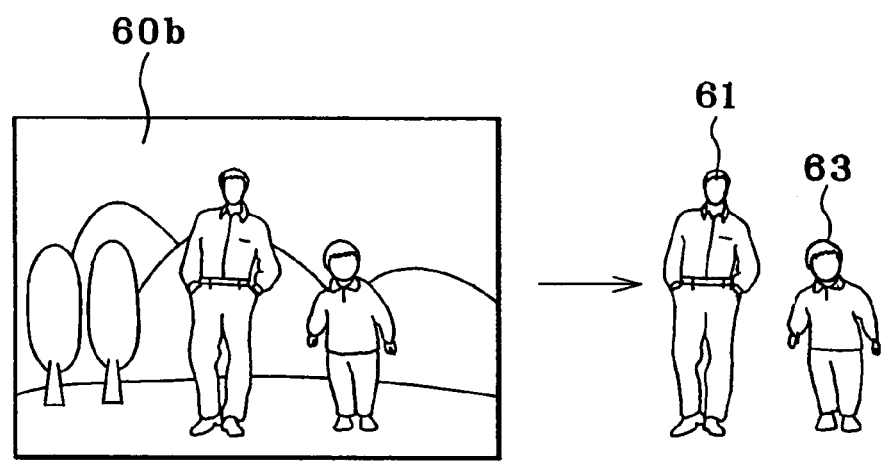
Figure 6C:
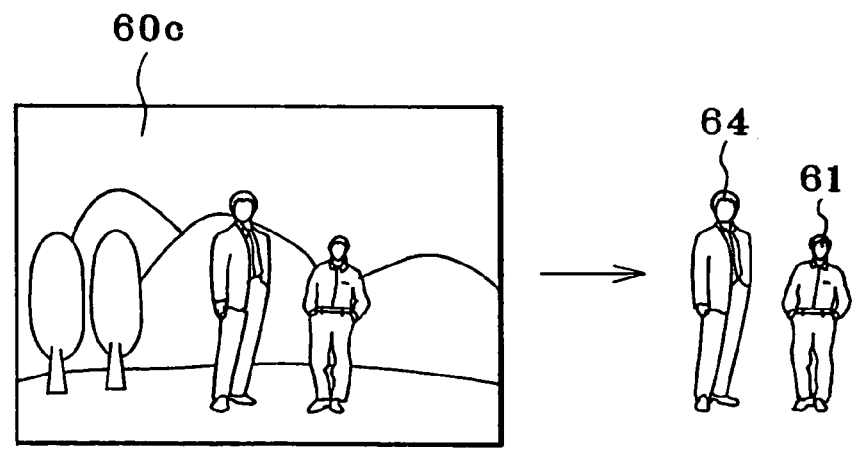

In FIGS. 6A, 6B and 6C, a plurality of group image frames 60a, 60b and 60c are read, which has an image portion of a first photographed object 61. Two or more photographed objects are derived from the group image frames. For example, the group image frame 60a is evaluated, to obtain a height ratio between the first photographed object 61 and a second photographed object 62 as 1/1. Then the group image frame 60b is evaluated, to obtain a height ratio between the first photographed object 61 and a third photographed object 63 as 1/0.7. Finally, the group image frame 60c is evaluated, to obtain a height ratio between the first photographed object 61 and a fourth photographed object 64 as 1/1.3. Information of the height ratios is written to the memory in the handset of the cellular phone 2 before the image synthesis.

Figure 7:
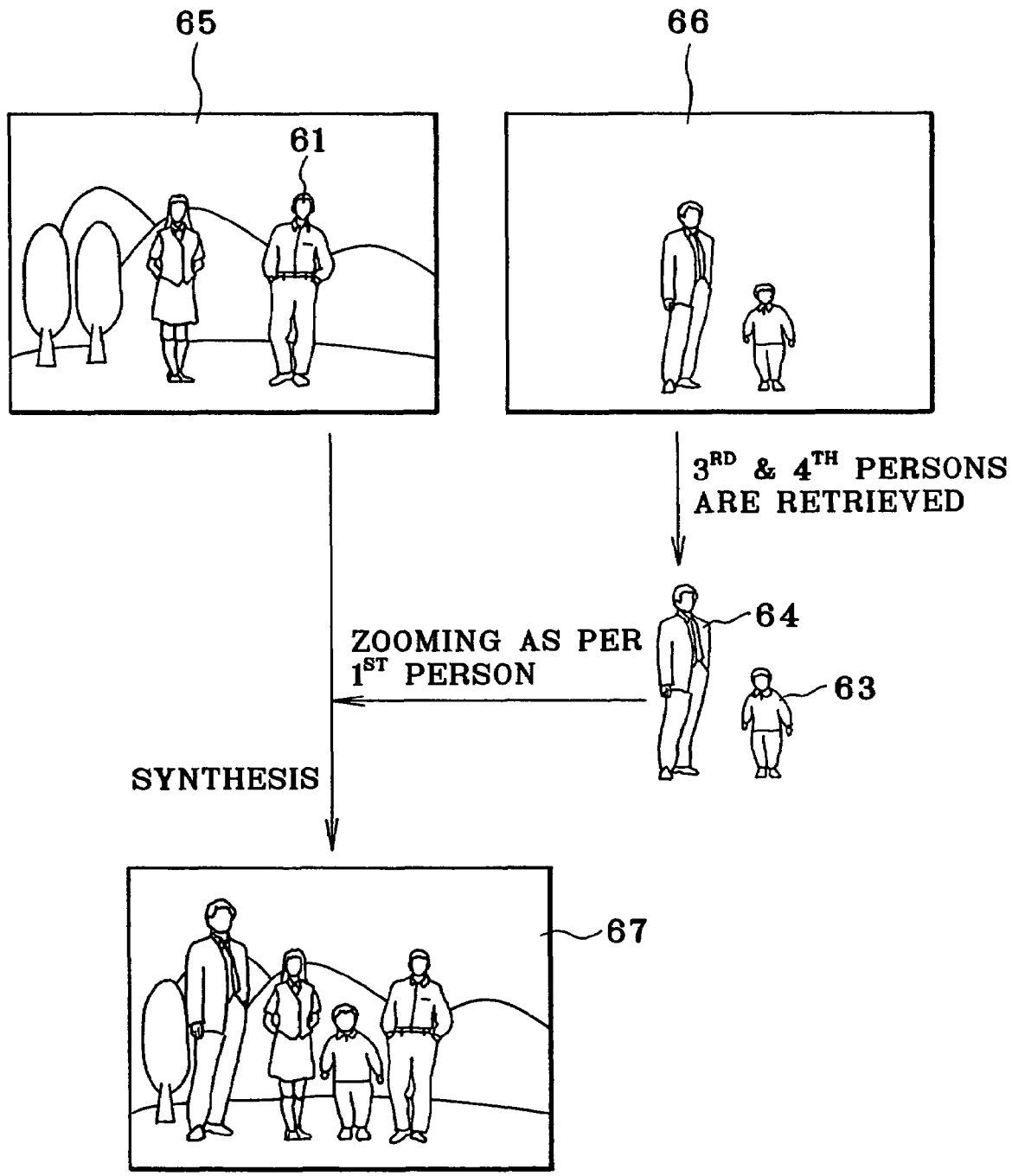
FIG. 7 is an explanatory view illustrating a process of obtaining the image synthesis by use of the combinations of FIGS. 6A-6C.

In FIG. 7, a first image frame 65 with the first and second photographed objects 61 and 62 is combined with a second image frame 66 having the third and fourth photographed objects 63 and 64. At first, image portions of the third and fourth photographed objects 63 and 64 are retrieved. Then, information of a height ratio between the objects is read. One of the third and fourth photographed objects 63 and 64 is enlarged or reduced in consideration of the first photographed object 61, before synthesis with the first image frame 65. Accordingly, it is possible to keep an actual relationship between the sizes of the objects in a synthesized image 67 without differing from a true relationship in the sizes.

In the above embodiment, the two image pickup units are directed in the opposite directions. It is very likely that a photographic field of one of the two is a rear light scene despite a photographic field of the remainder as a front light scene. Therefore, it is preferable to process a first one of the image frames by image processing for adjusting brightness, chromaticity and the like nearly equal to that of a second one of the image frames, and to combine the first with the second for the synthesis. Furthermore, it is likely that there are considerable differences between characteristics of the pickup lenses in the first and second image pickup units, for example, lens speed, distortion and the like. For such a construction, it is preferable to subject image frames to suitable correction before synthesis.

In the above embodiment, the pickup according to the invention is used in the handset of the cellular phone 2. However, the feature of the invention may be utilized in other optical equipment for image pickup, such as PDA (Personal Digital Assistant), digital still camera and the like.

Furthermore, a device of the invention may be a handset of the cordless telephone, a camera built-in type of notebook-formed computer, and the like.

Figure 8:
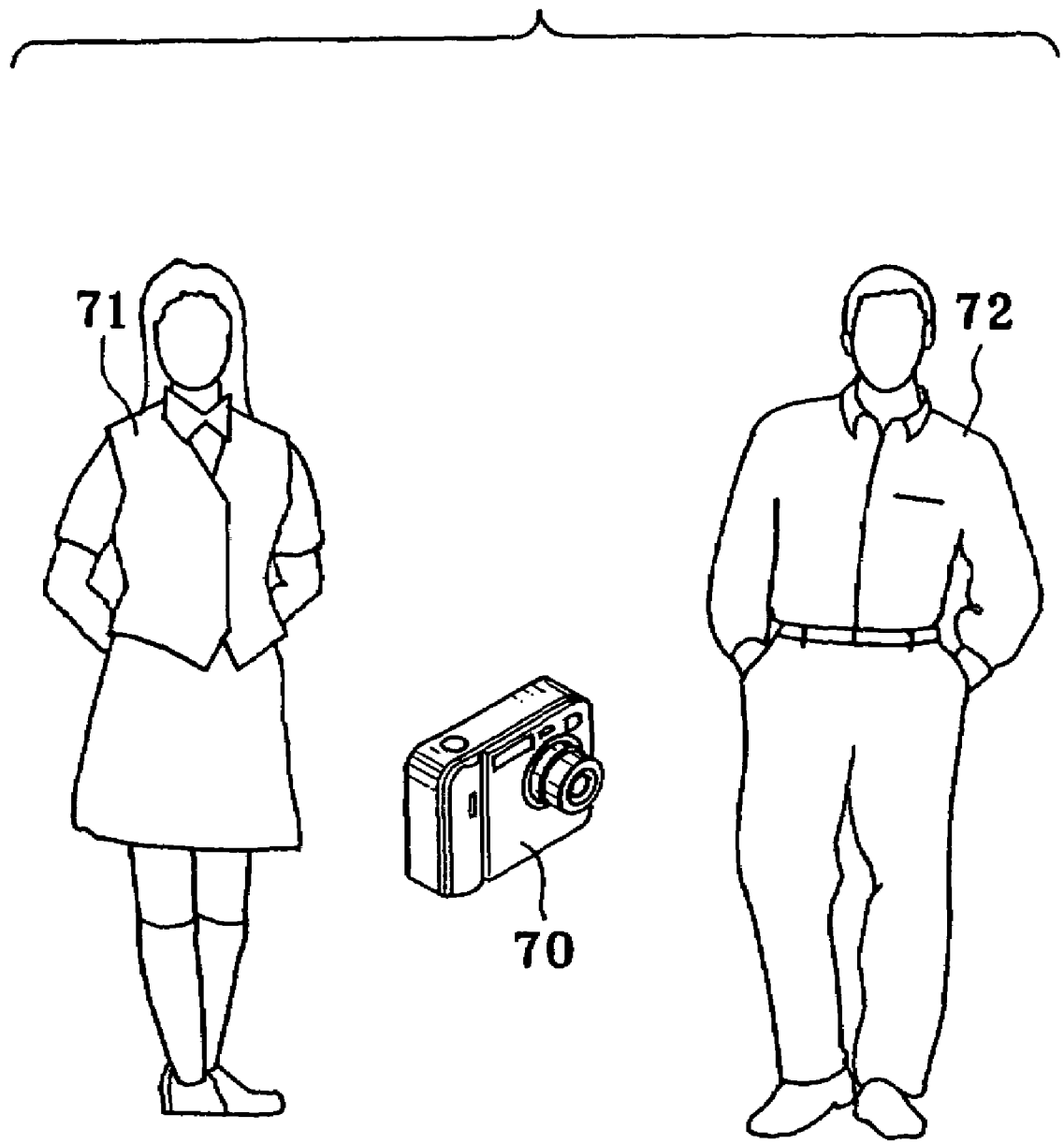
FIG. 8 is a perspective view illustrating another preferred embodiment in which two persons are alternately photographed.

In FIG. 8, a digital still camera 70 according to another preferred embodiment is used, having a single image pickup unit. A first person 71 as a photographing or photographed person is photographed. After this, a second person 72 is photographed. Then two images are synthesized. In the present embodiment, the digital camera 70 picks up images. However, an image pickup device of the embodiment can be a mobile communication terminal, PDA (Personal Digital Assistant) or the like.

Figure 9:
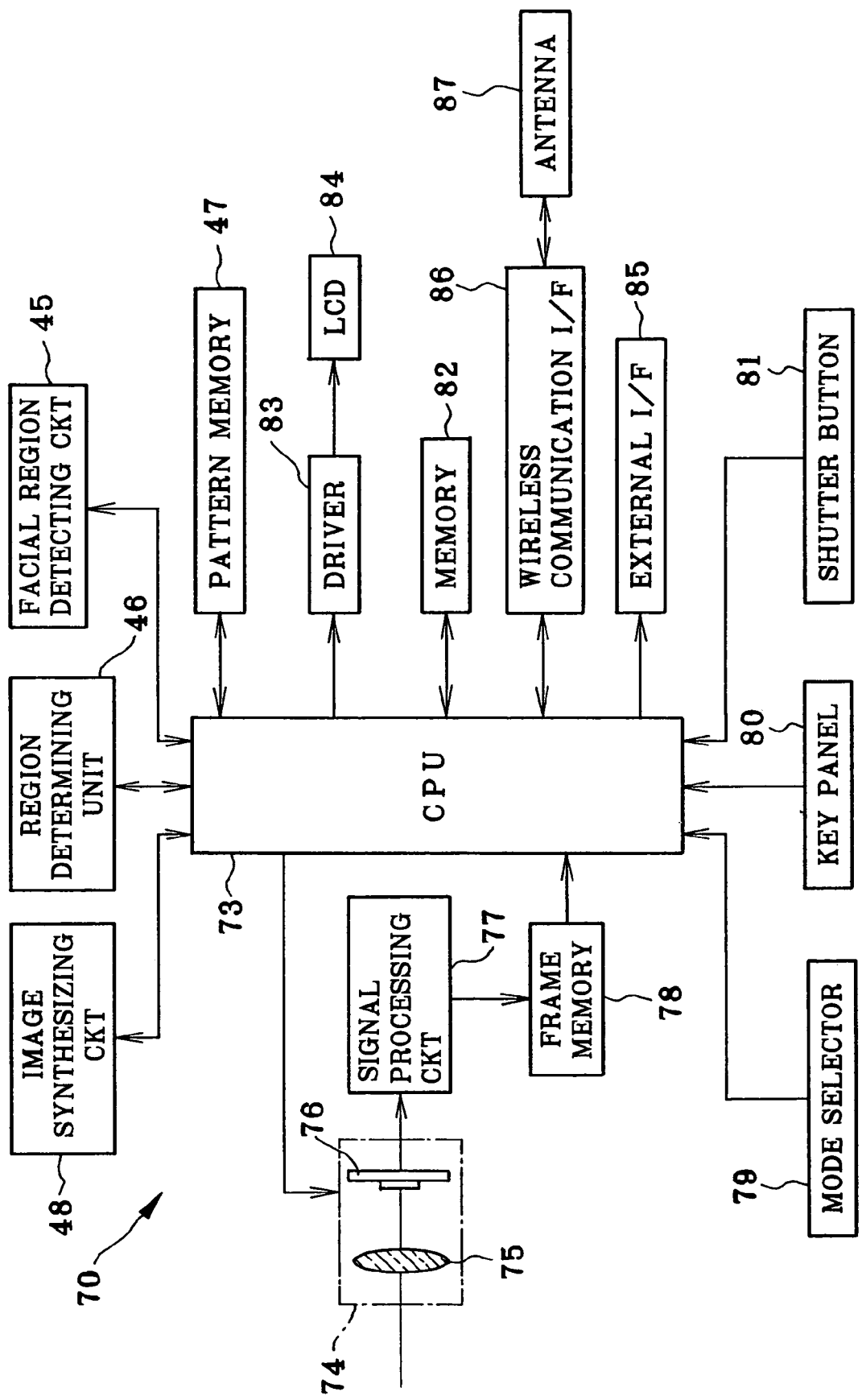
FIG. 9 is a block diagram schematically illustrating elements of a digital still camera.

In FIG. 9, elements of the digital camera 70 are schematically illustrated. CPU 73 or controller controls entire operation of the digital camera 70. A pickup element 76 or image sensor is combined with a pickup lens 75 in an image pickup unit 74, and converts an object image focused by the pickup lens 75 into an image signal. A signal processing circuit 77 subjects the image signal to processing, and converts the image signal into image data in a digital form. There is a frame memory 78 to which the image data is written in a temporary manner.

A mode selector 79 is externally operable and changes over the operation of the digital camera 70 between a normal pickup mode, synthesizing mode, and replaying mode. A key panel 80 is used to change the setting of the digital camera 70. When a shutter button 81 or pickup button is depressed in the normal pickup mode or synthesizing mode, the image data from the signal processing circuit 77 is compressed by a compression/expansion circuit (not shown). After this, the image data is written to a memory 82. A display panel 84 can be caused by a driver 83 to display an image frame according to the image data. Also, it is possible through an external interface (I/F) 85 to write the image data to an external memory (not shown) such as a memory card.

A communication unit having a combination of wireless communication interface (I/F) 86 and a transmission/reception antenna 87 is according to the Blue Tooth system (trade name). Image data obtained by the pickup can be transmitted to various electronic devices such as a digital still camera, an image synthesizing server, a communication terminal, and the like. Furthermore, it is possible to transmit image data by use of a public communication line (not shown).

Note that the facial region detecting circuit 45, the region determining unit 46, the pattern memory 47 and the image synthesizing circuit 48 are structurally the same as those of the above embodiment. Elements similar to those of the above embodiment are designated with identical reference numerals.

Figure 10:
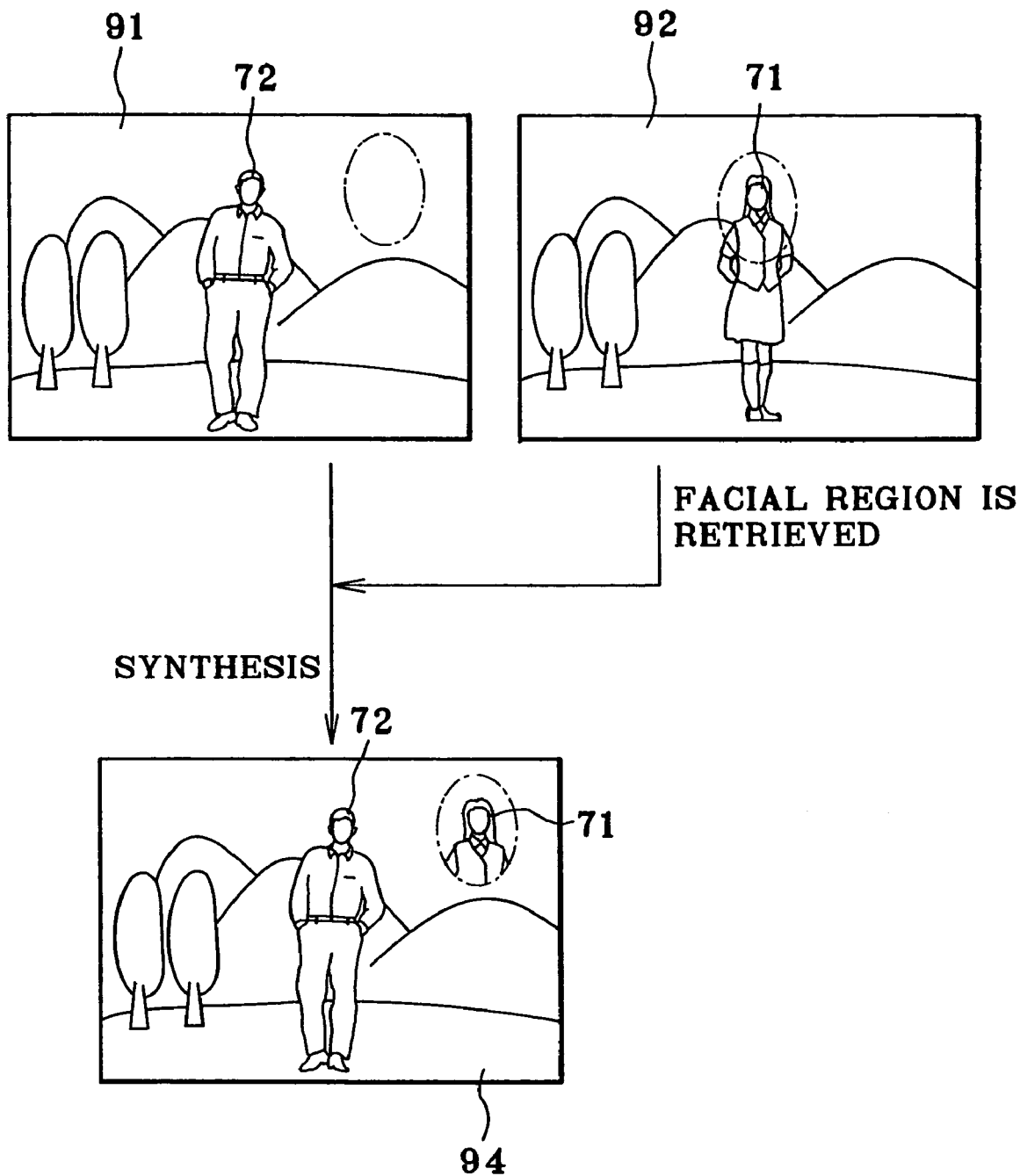
FIG. 10 is an explanatory view illustrating a process of producing a synthesized image.

A selection dial for selection of modes is rotated, to select a synthesizing mode. Then pickup is effected for two times. Two image frames are obtained and combined with one another to produce a synthesized image. In FIG. 10, the first person 71 photographs the second person 72, so a first image frame 91 is created. Then the second person 72 photographs the first person 71, so as to create a second image frame 92. Image data of the second image frame 92 is read by CPU 73 and sent to the facial region detecting circuit 45. The facial region detecting circuit 45 retrieves a facial region of the first person 71 in a manner similar to the above embodiment. Image data of the facial region is combined with image data of the first image frame in a manner without overlapping on the second person 72. Image data of a synthesized image 94 is written to the memory 82.

In the above embodiment, the facial region of the first person 71 photographed for the second time is extracted. However, a facial region of the second person 72 photographed for the first time can be extracted, and combined with the second image frame 92. See FIG. 11.

In contrast with the construction of FIG. 10, the first person 71 according to FIG. 11 is dimly or unclearly displayed together with the second person 72, namely in a distinctly lower sharpness than the second person 72. The sequence is that the first person 71 is photographed at first, then the second person 72 is photographed next. In the region determining unit 46, image data of an image of the first person 71 is retrieved, and displayed in a colored transparent manner or translucent manner for simulation while the second person 72 is framed and photographed. After photographing the second person 72, the image processing is made to synthesize the image of the first person 71 exactly in the simulated manner. By observing and considering the first person 71 indicated in the colored transparent manner, the second person 72 is framed. Thus, the positions of those can be adjusted with great ease.

Figure 12:
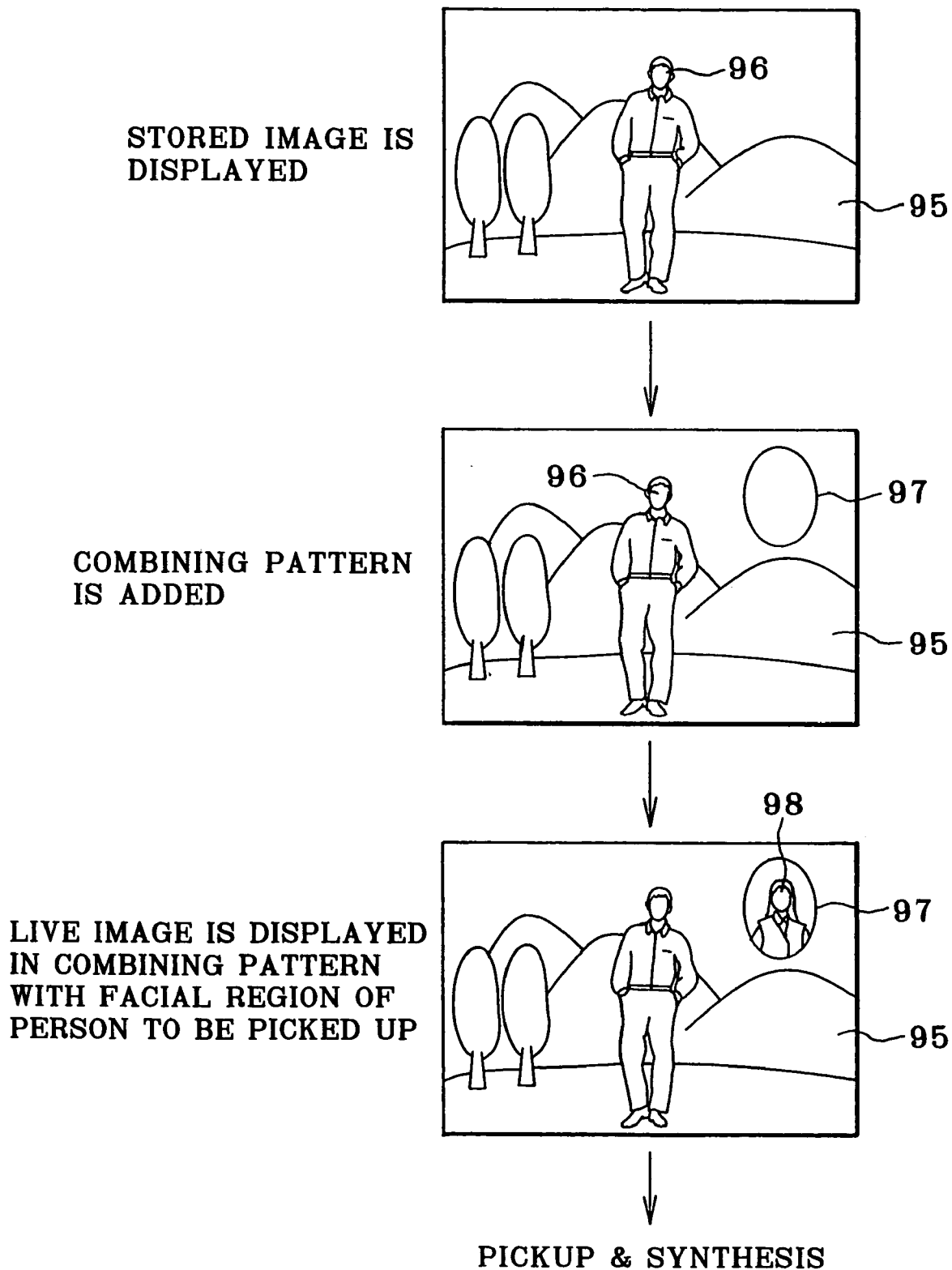
FIG. 12 is an explanatory view illustrating an embodiment where a second one of two image frames is displayed as a live image or through image.

In FIG. 12, another preferred embodiment is illustrated, in which a combining pattern is indicated with a photographed image frame, for displaying in the form of live image or through image of a facial region of a person to be photographed during the framing operation. There is a storage medium (not shown) from which image data is read, so a stored image frame 95 is indicated in the display panel 84. One portion in the frame outside a person image 96 is automatically detected, or manually designated by an input signal of a user. A combining pattern 97 as a facial region is indicated. A facial portion of a photographed person 98 as a photographed object is derived from the image frame at the time of the framing, and displayed in the combining pattern 97. Thus, the face of the person 98 is displayed as a live image in the combining pattern 97. Note that the first image frame is used as a basis, into which the portion at the person 98 in the second image frame is inserted.

Furthermore, a reference photographed object may be utilized and referred to for adjusting the person heights. If a background of the first and second image frames 91 and 92 is nearly the same, a certain object may be designated, for example, a tree, advertising board, person or the like in the background. The first or second object may be enlarged or reduced proportionally before the synthesis. For a person as the reference photographed object, see the first photographed object 61 in FIGS. 6A-6C. Note that the reference photographed object may be manually determined during the framing operation, and also can be automatically retrieved from image data of the first and second image frames 91 and 92.

In the above embodiments, the single image pickup device is used. However, plural image pickup devices may be used. In FIG. 13, a first person 100A uses a first digital still camera 101, and photographs an image of a second person 100B to record a first image frame. The second person 100B uses a second digital still camera 102, and photographs an image of the first person 100A to record a second image frame, each of the first and second persons 100A and 100B being a photographing or photographed person. Image data of the second image frame is transmitted in a wireless communication by the second digital camera 102 to the first digital camera 101 as an image synthesizing electronic instrument. In the first digital camera 101, an image portion of the first person 100A is taken out of the second image frame, is combined with the first image frame at its background, to produce a synthesized image. Image data of the synthesized image is transmitted back to the second digital camera 102 wirelessly.

Also, an image portion having the second person 100B may be cropped from the first image frame, and can be combined with the background of the second image frame for the synthesis.

In FIG. 14, an embodiment is illustrated, with image synthesis in an image synthesizing server 105 as an image synthesizing electronic instrument. Image data from the two digital cameras 101 and 102 are transmitted to the image synthesizing server 105, which produces a synthesized image from the image data. Produced image data of the synthesized image can be transmitted back to the two digital cameras 101 and 102.

It is to be noted that each of the first and second persons 100A and 100B as user of image pickup devices can photograph himself or herself as self-portrait. Image data of those users can be transmitted to an image synthesizing server, which may be caused to produce a synthesized image. No matter how distant the first and second persons 100A and 100B are located, the synthesized image can be produced safely. Note that examples of the image pickup devices are the first digital camera 101 used by the first person 100A, and the second digital camera 102 used by the second person 100B, but can be the handset of the cellular phone 2 for each of those.

Furthermore, it is possible in the second digital camera 102 to display the obtained image frame according to the image data transmitted from the first digital camera 101 to the second digital camera 102. See FIG. 11. In the second digital camera 102, an object can be displayed as a live image or through image in combination with the image picked up by the first digital camera 101.

In the above embodiment, the two digital cameras 101 and 102 are used. However, three or more digital cameras may be used in combination.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image pickup device for photographing an object, comprising:
   a facial region detector for retrieving at least a facial region of a first object in a first image in which said first object is a principal object thereof;
   an image synthesizing unit for creating a synthesized image by combining a second image with said facial region from said facial region detector, said second image having a second object constituting a principal object thereof, wherein said facial region is disposed in a background region beside said second object within said second image; and
   a region determining unit for determining said background region of said second image, wherein said image synthesizing unit creates said synthesized image according to determined information from said region determining unit.

2. An image pickup device as defined in claim 1, further comprising a display panel for displaying said synthesized image.

3. An image pickup device as defined in claim 2, wherein said image synthesizing unit trims said facial region from said first image by positioning a predetermined combining pattern thereon before image synthesis.

4. An image pickup device as defined in claim 3, wherein said facial region detector detects an eye position from said facial region, and said image synthesizing unit positions said combining pattern in consideration of said eye position.

5. An image pickup device as defined in claim 4, wherein said eye position is a mid point of two eyes of said facial region, and a center of said combining pattern is set at said mid point.

6. An image pickup device as defined in claim 4, further comprising a pattern memory for storing information of plural combining patterns adapted to selection of one thereof.

7. An image pickup device as defined in claim 2, wherein said image synthesizing unit further enlarges or reduces the size of said facial region to be synthesized.

8. An image pickup device as defined in claim 2, further comprising:
   a first image pickup unit for photographing an image pickup device user constituting said first object in a self photographing manner; and
   a second image pickup unit for photographing said second object disposed in an external field in front of said first object.

9. An image pickup device as defined in claim 8, wherein said display panel displays said first and second images simultaneously according to outputs of said first and second image pickup units.

10. An image pickup device as defined in claim 9, further comprising a shutter button for driving said first and second image pickup units simultaneously to obtain said first and second images.

11. An image pickup device as defined in claim 2, wherein said image synthesizing unit refers to chromaticity or brightness of one of said first and second images, and adjusts chromaticity or brightness of a remaining one of said first and second images according to said one image, before image synthesis.

12. An image pickup device as defined in claim 2, wherein said image synthesizing unit combines said first image of said first object being photographed with a live image of said second object while said second object is framed for still photography, and causes said display panel to display said synthesized image.

13. An image pickup device as defined in claim 12, wherein said display panel is caused to display said first image of said first object at a low density or low sharpness.

14. An image pickup device as defined in claim 12, wherein said display panel displays a combining pattern in said live image, and displays at least one portion of said first object in said combining pattern.

15. An image pickup device as defined in claim 2, further comprising an image pickup unit for photographing said first and second objects to create said first and second images.

16. An image pickup device as defined in claim 2, further comprising:
   an image pickup unit for photographing one of said first and second objects; and a communication unit for receiving data of said first or second image of a remaining one of said first and second objects from an external electronic device.

17. An image pickup device as defined in claim 16, wherein said communication unit is wireless.

18. An image pickup device as defined in claim 16, wherein said communication unit is for connection with a public communication cable.

19. The image pickup device according to claim 8, wherein the second image pickup unit is structurally equal to the first image pickup unit.

20. An image synthesizing method, comprising steps of:
retrieving at least a facial region of a first object from a first image in which said first object is recorded;
determining a background region within a second image in which a second object is recorded; and
combining said facial region being retrieved with the determined background region within the second image in which the second object is recorded.

21. An image synthesizing method as defined in claim 20, further comprising:
using at least one image pickup device to photograph said first and second objects.

22. An image synthesizing method as defined in claim 20, wherein said facial region is trimmed from said second image according to a predetermined combining pattern.

23. An image synthesizing method as defined in claim 22, further comprising steps of:
detecting an eye position in said facial region; and
positioning said combining pattern in consideration of said eye position.

24. An image synthesizing method as defined in claim 23, wherein said eye position is a mid point of two eyes of said facial region, and a center of said combining pattern is set at said mid point.

25. An image synthesizing method as defined in claim 21, wherein said using the at least one image pickup device comprises:
photographing an image pickup device user constituting said first object in a self photographing manner by a first image pickup unit included in the at least one image pickup device;
photographing said second object disposed in an external field in front of said first object by a second image pickup unit included in the at least one image pickup device,
wherein said first and second image pickup units are driven simultaneously using a shutter button of the at least one image pickup device to obtain said first and second images.

26. An image synthesizing method as defined in claim 20, further comprising steps of:
obtaining a first height of said first object in said first image, and a second height of said second object in said second image according to image analysis; and
enlarging or reducing a size of said facial region according to a height ratio related to said first or second height of said first or second objects before image synthesis.

27. An image synthesizing method as defined in claim 20, further comprising steps of:
obtaining a first height ratio of a first height of said first object in said first image to a height of a reference photographed object;
obtaining a second height ratio of a second height of said second object in said second image to a height of said reference photographed object;
dividing one of said first and second height ratios by a remaining one of said first and second height ratios, to obtain a correcting coefficient for said first and second objects;
enlarging or reducing a size of said facial region by multiplication of said correcting coefficient before image synthesis.

28. An image synthesizing method as defined in claim 20, further comprising steps of:
displaying a live image of said second object to be photographed on a display panel; and
displaying said at least facial region of said first object being photographed on said display panel by synthesis while the second object is formed for still photography.

29. An image synthesizing method as defined in claim 20, wherein chromaticity or brightness of one of said first and second images is referred to, and chromaticity or brightness of a remaining one of said first and second images is adjusted according to said referred image, before image synthesis.

30. An image synthesizing method as defined in claim 20, wherein one of said first and second images is photographed by a first image pickup device; and
a remaining one of said first and second images is input to said first image pickup device by a communication unit.

31. An image synthesizing method as defined in claim 30, wherein image data of said second image, being photographed in a second image pickup device, is transmitted to said first image pickup device which photographs said first image by use of a communication unit.

32. An image synthesizing method as defined in claim 20, further comprising steps of:
photographing said first and second images by use of respectively first and second image pickup devices; and
transmitting image data of said first and second images from said first and second image pickup devices to an image synthesizing electronic device by use of a communication unit.

33. An image synthesizing method as defined in claim 20, wherein said at least facial region is constituted by a human body region.

* * * * *